United States Patent
Nanavati et al.

(10) Patent No.: US 7,707,173 B2
(45) Date of Patent: Apr. 27, 2010

(54) SELECTION OF WEB SERVICES BY SERVICE PROVIDERS

(75) Inventors: Amit Anil Nanavati, New Delhi (IN); Archan Misra, Irvington, NY (US); Dipanjan Chakraborty, Kolkata (IN); Suraj Kumar Jaiswal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 11/183,058

(22) Filed: Jul. 15, 2005

(65) Prior Publication Data

US 2007/0016573 A1    Jan. 18, 2007

(51) Int. Cl.
G06F 7/00 (2006.01)
G06F 17/00 (2006.01)

(52) U.S. Cl. .......................................... 707/608; 705/7

(58) Field of Classification Search .................. 707/5, 707/100, 713, 790, 791; 705/26
See application file for complete search history.

(56) References Cited

U.S. PATENT DOCUMENTS

| | | | |
|---|---|---|---|
| 6,516,350 B1 * | 2/2003 | Lumelsky et al. ............ 709/226 |
| 7,096,193 B1 * | 8/2006 | Beaudoin et al. .............. 705/26 |
| 7,418,426 B1 * | 8/2008 | Reunert et al. ................ 705/40 |
| 2001/0049632 A1 | 12/2001 | Rigole |
| 2003/0115073 A1 * | 6/2003 | Todd et al. ...................... 705/1 |
| 2003/0120530 A1 | 6/2003 | Casati et al. |
| 2003/0144860 A1 | 7/2003 | Casati et al. |
| 2003/0163454 A1 * | 8/2003 | Jacobsen et al. ................ 707/3 |
| 2003/0182413 A1 | 9/2003 | Allen et al. |
| 2004/0034797 A1 | 2/2004 | Becker Hof |
| 2004/0064449 A1 * | 4/2004 | Ripley et al. .................... 707/5 |
| 2004/0073596 A1 | 4/2004 | Kloninger et al. |
| 2004/0111430 A1 * | 6/2004 | Hertling et al. ............ 707/104.1 |
| 2004/0121758 A1 | 6/2004 | Hoche et al. |

(Continued)

OTHER PUBLICATIONS

Freire et al. "Web Views: accessing personalized web content and services" Apr. 2001 Proceedings of the 10th international conference on World Wide Web WWW '01 Publisher: ACM Press.*

(Continued)

*Primary Examiner*—Kuen S Lu
*Assistant Examiner*—Berhanu Mitiku
(74) *Attorney, Agent, or Firm*—Gibb I.P. Law Firm, LLC (57) ABSTRACT

A Web services-oriented service provider middleware architecture and implementation is provided that integrates the performance monitoring of individual CPs, along with other dynamic contextual conditions, in the automatic selection of appropriate CPs. In the architecture, a CP's performance is evaluated not only in terms of network or service-level parameters, but also via other business processes (e.g., complaint handling). The selection of multiple Web services occurs through an initial filtering of a set of feasible workflows for each task depending on business agreements and end user needs, and a subsequent dynamic context-based selection of the most appropriate workflow. A workflow filtering and ranking engine uses metarules to guide the optimisation process and help in selecting and ranking the feasible workflows. The component services in the workflows are evaluated by evaluator processes of information sources. The workflow engine outputs the workflows in their preference ranking. At runtime, if the workflow and/or its components meet all the runtime requirements (performance, for example), then the workflow is selected and executed.

16 Claims, 5 Drawing Sheets

U.S. PATENT DOCUMENTS

| | | | |
|---|---|---|---|
| 2004/0148407 | A1 | 7/2004 | Albertine Trappeniers et al. |
| 2004/0162741 | A1* | 8/2004 | Flaxer et al. ............... 705/7 |
| 2004/0260597 | A1 | 12/2004 | Nishikawa et al. |
| 2005/0043986 | A1 | 2/2005 | McConnell et al. |
| 2005/0125269 | A1* | 6/2005 | Batra et al. ............... 705/7 |
| 2005/0138187 | A1* | 6/2005 | Breiter et al. ............ 709/229 |
| 2006/0085423 | A1* | 4/2006 | Barsness et al. ........... 707/10 |
| 2006/0136490 | A1* | 6/2006 | Aggarwal et al. ....... 707/103 R |
| 2006/0200797 | A1* | 9/2006 | Grasselt et al. ........... 717/107 |
| 2006/0212359 | A1* | 9/2006 | Hudgeon .................. 705/26 |
| 2006/0271928 | A1* | 11/2006 | Gao et al. ............... 717/176 |

OTHER PUBLICATIONS

Wongrujira, et al. "Provision resource bidding for special service provider in decoupling spaces network" vol. 1, Sep. 21-24, 2003 pp. 363-367 vol. 1 Digital Object Identifier 10.1109/APCC.2003.1274376.*

Day et al. "Selecting the Best Web Service" Oct. 2004 Proceedings of the 2004 conference of the Centre for Advanced Studies on Collaborative research CASCON '04 IBM Press.*

Hollingsworth "Workflow Management Coalition The Workflow Reference Model" Workflow Management Coalition,2 Crown Walk, Winchester Hampshire, UK Jan. 19, 1995.*

Stamoulis et al. "Agent-Based Service and Retailer Selection in a Personal Mobility Context" Institute of Computer Science, Foundation for Research and Technology Hellas H. Zuidweg et al. (Eds.): IS&N'99, LNCS 1597, pp. 429-442, 1999.*

Sreenath et al. "Agent-based service selection" Web Semantics: Science, Services and Agents on the World Wide Web 1 (2004) 261-279.*

Chen et al. "An Agent-based Framework For Dynamic Web Service Selection" Department of Computer Science, Ryerson University.*

Cao et al. "A Web-Based Fuzzy-AHP Method for VE Partner Selection and Evaluation" W. Shen et al. (Eds.): CSCWD2004, LNCS 3168, pp. 270-278, 2 Springer-Verlag Berlin Heidelberg 2005.*

Nanavati et al. "Mining Generalised Disjunctive Association Rules" IBM India Research Laboratory, Block1, Indian Institute of Technology Hauz Khas, New Delhi110016.*

W. T. Balke and M. Wagner, Towards personalized selection of web services, In *12th International Conference on World Wide Web (WWW)*, Budapest, Hungary, May 2003.

H Lei, D. M. Sow, J. S. D. II, G. Banavar and M. R. Ebling, The design and applications of a context service, *Mobile Computing and Communications Review (MC2R)*, 6(4):45-55, Oct. 2002.

Y. Liu, A. H. Ngu, and L. Zeng, Qos computation and policing in dynamic web service selection, in *13th International Conference on World Wide Web (WWW)*, New York, ACM Press, May 2004.

A. Nanavati, K. P. Chitrapura, S. Joshi, R.Krishnapuram, Mining generalized disjunctive association rules, In *10th International Conference on Information and Knowledge Management (CIKM)*, Atlanta, Georgia, pp. 482-489, 2001.

M. Samulowitz, F. Michahelles and C. Linnhoff-Popein, CAPEUS: An architecture for context-aware selection and execution of services, In *Third IFIP WG6.1 International Working Conference on Distributed Application and Interoperable Systems (DAIS'2000)* Krakow, Poland, Sep. 2001.

R.M. Sreenath and M. P. Singh, Agent-based service selection, *Journal on Web Semantics (JWS)*, 2003.

X. Xiao and L. M. Ni, Internet qos: A big picture, IEEE Network Magazine, 13:8-18, Mar. 1999.

L. Zeng, B. Benatallah, M. Dumas, J. Kalagnanam and Q. Z. Sheng, Quality driven web services composition, In *12th International Conference on World Wide Web (WWW)*, Budapest, Hungary, May 2003.

L. Zheng, B. Benatallah, A. H. H. Ngu, M. Dumas, J. Kalagnanam and H. Chang, Qos-aware middleware for web services composition, IEEE Transactions on Software Engineering, 30(5):311-327, 2004.

\* cited by examiner

| | | | | |
|---|---|---|---|---|
| http://9182.217.166:9080/ChanakyaMoviesWS/services/TicketResvPort/wsdl | theatre | slow | midsegment | offpeak | remote |
| http://9182.217.166:9080/FedExWS/services/CourierPort/wsdl | courier | slow | midsegment | midload | local |
| http://9182.217.166:9080/YahooMapWS/services/DirectionPort/wsdl | drive | fast | regular | peak | remote |
| http://9182.217.166:9080/ChanakyaMoviesWS/services/TicketResvPort/wsdl | theatre | medium | midsegment | offpeak | local |
| http://9182.217.166:9080/PVRMoviesSaket/services/ReservTicketPort/wsdl | theatre | medium | midsegment | midload | remote |
| http://9182.217.166:9080/PVRMoviesSaket/services/ReservTicketPort/wsdl | theatre | slow | regular | offpeak | remote |
| http://9182.217.166:9080/PVRMoviesGur/services/MovieTicketReservationPort/wsdl | | | midsegment | midload | local |
| http://9182.217.166:9080/ICICI-WS/services/DebitPort/wsdl | bank | fast | midsegment | midload | local |

Fig. 4 http://9.182.217.166:9080/WavesMoviesNoida/services/MovieTicketingPort/wsdl;http://9.182.217.166:9080/PVRMoviesGur/services/MovieTicketReservationPort/wsdl;http://9.182.217.166:9080/PVRMoviesSaket/services/ReservTicketPort/wsdl;http://9.182.217.166:9080/HDFC-WS/services/DebitPort/wsdl;http://9.182.217.166:9080/YahooMapWS/services/DirectionPort/wsdl;http://9.182.217.166:9080/ICICI-WS/services/DebitPort/wsdl;http://9.182.217.166:9080/DHL-WS/services/CourierPort/wsdl

Fig. 5

SELECTION OF WEB SERVICES BY SERVICE PROVIDERS

FIELD OF THE INVENTION

This invention relates to the field of web services, and particularly to a service provider serving customer requests through selecting and invoking an appropriate content provider service.

BACKGROUND

Service providers (SPs) primarily act as service portals, offering a variety of services either using in-house solutions or through partnerships with various third party business services. In many instances, these business services act as services/content providers (CP). To enable provision of a particular service or content, a SP might interact with only a single CP or might leverage a composite workflow involving the invocation of multiple third party CPs. Examples of such interaction between SPs and CPs are presently observed in both the Internet service providers and telecom/cellular service provider markets.

At present, SPs primarily depend on static business contracts with their CPs to enable service delivery. Usually, third-party services are tightly integrated into an SP-proprietary platform, based on custom APIs. Such a "walled-garden" IT model is restrictive, however, as it does not enable either the SP or the individual CPs to leverage the benefits of a competitive, market-driven service infrastructure. This problem will become especially acute with the adoption of universal service interface standards (e.g. such as IBM's *Web Services Inspection Language* 1.0, and the World Wide Web Consortium's *Web Services Description Language* 1.1 and the UDDI Consortium's *Universal Description Discovery and Integration Specification*), which enable the invocation of services using a standard language and platform-independent format that encapsulates all implementation-specific details.

From the SP's viewpoint, the use of static contractual agreements prevents it from being able to dynamically select among competing content providers (CPs), based on changes in customer profile or context or on the performance profile of individual CPs. From the individual CP's viewpoint, the adoption of standard service invocation mechanisms allows it to associate and peer with multiple, usually competing, SPs, and thereby expand the CP's reach without an unacceptable increase in its service implementation and management costs.

In R. M. Sreenath and M. P. Singh, "Agent-based service selection", *Journal on Web Semantics* (JWC), 2003, a system is disclosed that assumes that there are (peer-to-peer) user communities within the system. A user selects a service from a pool of alternative services based on the peer recommendation. Agents act as proxies for peer users. The winner service is determined by a weighted average calculation of the recommended ratings. After service use, the user scores the service providers based on the service quality perceived by them and adjusts the weights of the other peer users whose recommendations led to the selection of that particular service provider. The scoring by the user (based on his experience with the service) and the rating of other users acts as a feedback loop to the service selection system, helping the user the next time he/she selects the service for the same task. Sreenath describes rating and scoring of services based on evaluation.

In summary, while mechanisms for dynamic service discovery and ontology-based composition are known, what is of interest is mechanisms and processes by which a SP can monitor the performance of such services and base the dynamic selection of CP services on such monitoring and higher (business) level policies, and on context.

SUMMARY

A Web services-oriented service provider middleware architecture and implementation is provided that integrates the performance monitoring of individual service/content providers (CPs), along with other dynamic contextual conditions, in the automatic selection of appropriate CPs. In the architecture, a CP's performance is evaluated not only in terms of network or service-level parameters, but also via other business processes (e.g., complaint handling). The selection of multiple Web services occurs through an initial filtering of a set of feasible workflows for each task depending on business agreements and end user needs, and a subsequent dynamic context-based selection of the most appropriate workflow.

A workflow filtering and ranking engine uses metarules to guide the optimisation process and help in selecting and ranking the feasible workflows. The component services in the workflows are evaluated by evaluator processes of information sources. The workflow engine outputs the workflows in their preference ranking. At runtime, if the workflow and/or its components meet all the runtime requirements (performance, for example), then the workflow is selected and executed.

DETAILED DESCRIPTION

Figure 1:
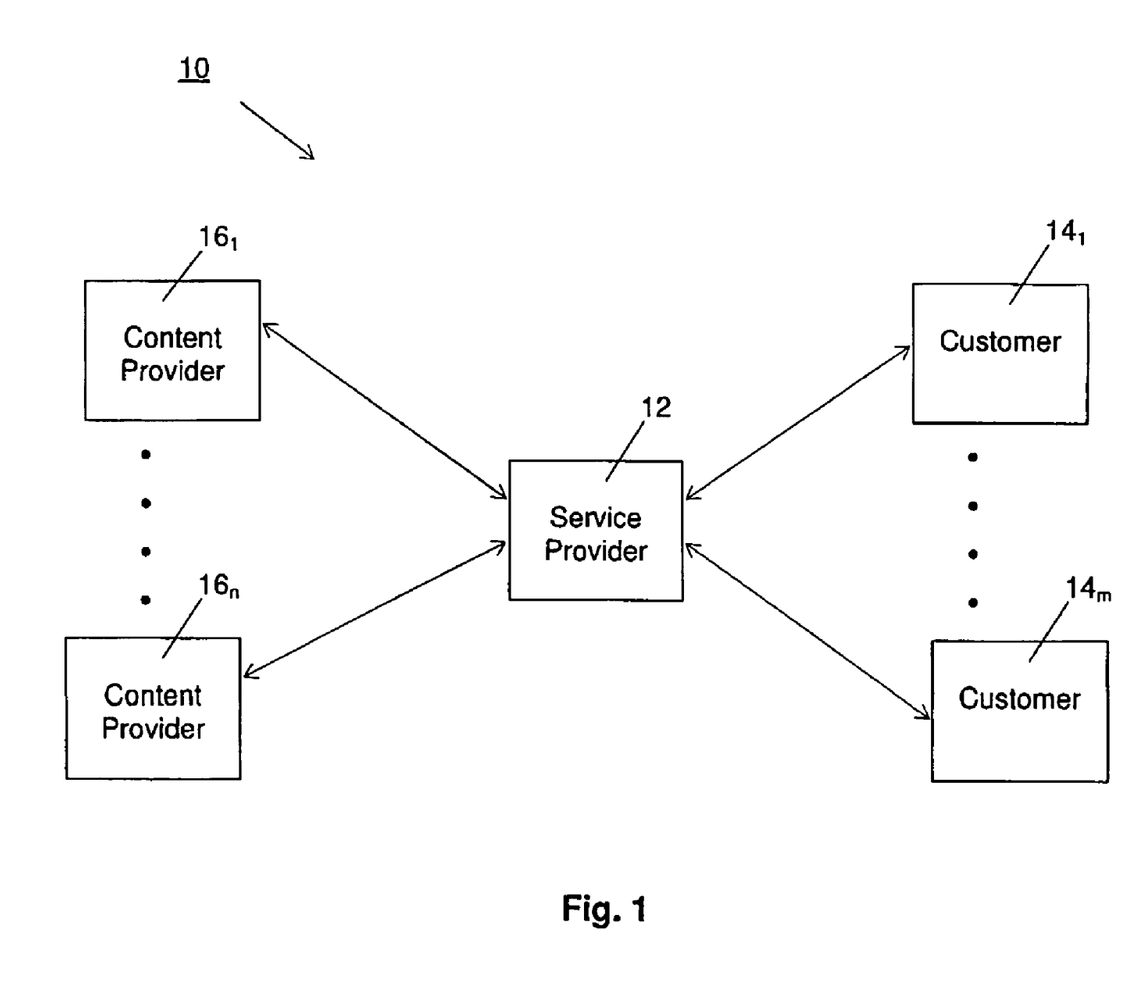
FIG. 1 shows a Web services system.

FIG. 1 is a block diagram of a Web services system 10. A service provider computer system (SP) 12 receives service requests from customer computers $14_m$ and selects the appropriate content provider computer system (CP) $16_n$ to provide the service according to the filtering and selection processes described below. The SP 12 then invokes that service and serves the result to the requesting customer 14.

Figure 2:
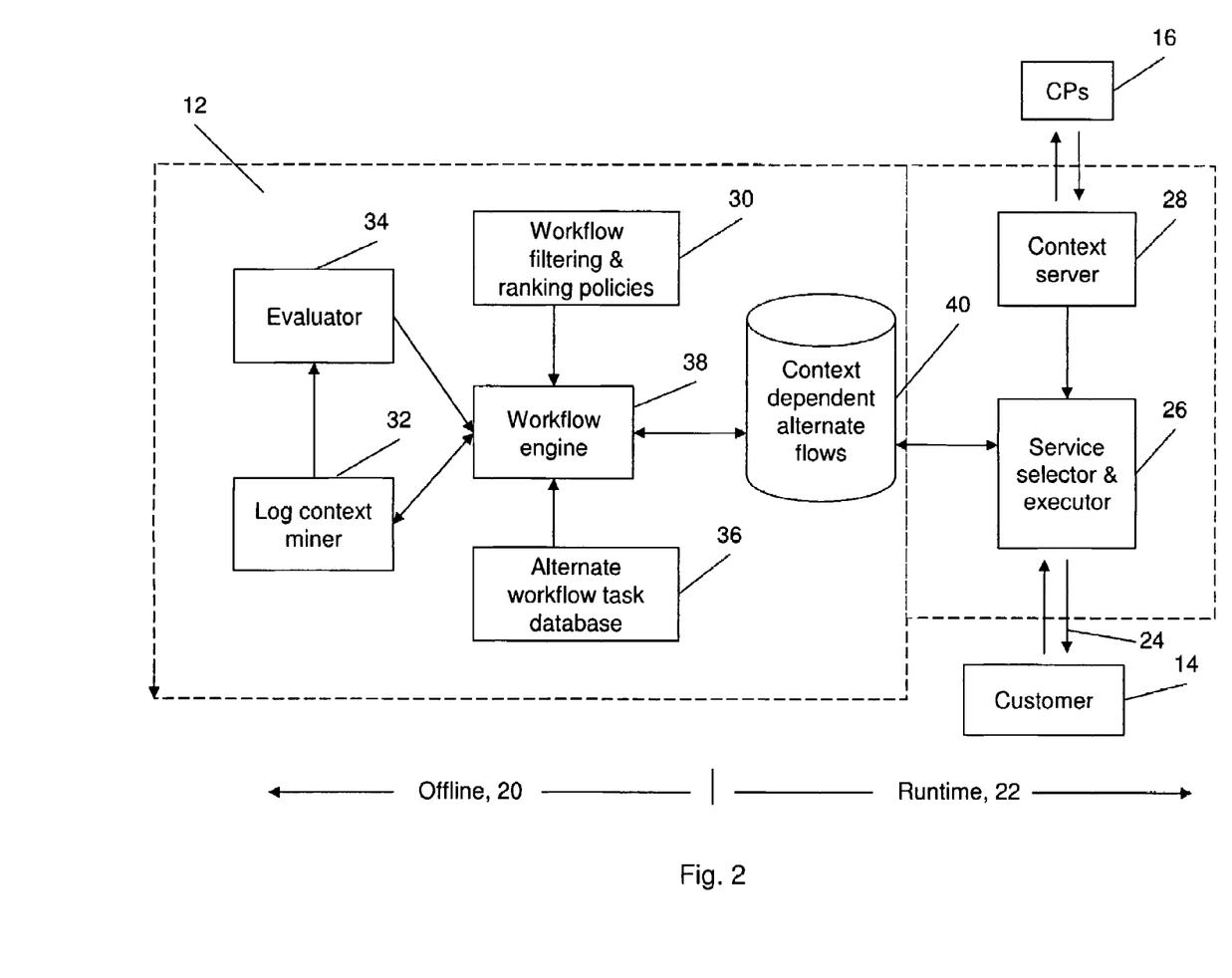
FIG. 2 shows a middleware architecture for the Service Provider.

FIG. 2 is a block diagram showing greater detail of the SP 12 middleware architecture. 'Metarules' are used to achieve filtering and ranking of the feasible workflows. The selection and ranking of workflows satisfying a metarule is logically separated from actual service execution time computational requirements. The architecture thus is logically separated into two sets of modules: offline 20 and online 22.

Offline

The offline components 20 primarily carry out the monitoring, evaluation and filtering of workflows by considering slow-changing context (mostly associated with business context and rules between SP and CPs). Customer profiles are used to capture such information and utilise it to personalise the content, apply preferences and privacy considerations while evaluating and selecting a service. This information is used to generate the metarules that specify evaluation and selection criteria for the competing CPs 16. For example, a customer 14 may be categorised as price-sensitive depending on the type of service he has used before. A corresponding metarule will try to filter costly CPs while choosing a service (or a workflow) for the user. Metarules exist within a workflow filtering and ranking policies module 30, stored as XML documents. One example metarule could be: "For premium customers, use services whose ranks are either '1' or '2' and who at present are providing a fast response time".

Metarules also capture several business preferences/contexts that refer to service-level agreements such a minimum transactions required to obtain certain discounts, transaction volume guarantees, service failure contingencies, etc. As an example, a metarule can be used to capture a SP's decision to offer cheaper services to price-sensitive customers, and content-rich, quick response to quality-sensitive customers.

The offline components 20 also carry out run-time logging to ensure satisfaction of the metarules derived out of these business contexts, and such data is stored in a log context miner module 32. The log module 32 monitors statistical, aggregated, customer-centric, service-centric and/or location-dependent performance of CPs 16.

An evaluator module 34 draws on the information logs 32, determines the long-term performance of the CPs, and provides a feedback control mechanism that is utilized to further refine the filtering, evaluation and selection mechanism.

A set of alternative workflows per task is provided through a task database 36. These workflows may be composed of alternative web services from various CPs 16, and may also include multiple instances of the same web service from one particular CP. The alternative workflows may be orchestrated using commonly used standards like BPEL (Business Process Execution Language for Web Services, available from http://www.ibm.com/developerworks/library/specification/ws-bpel, incorporated herein by reference). Moreover, alternate workflows for the same task may be obtained from high-level planners (see K. Erol, J. Hendler and D. Nau, "HTN planning: Complexity and expressivity, in *Proc. AAAI.*, 1994.).

A processing (workflow) engine 38 operates to select and rank the alternative workflows based on the business optimization criteria provided in the business policies 30. The engine 38 outputs a set of context-dependent alternative workflows 40 which summarize the conditions under which a workflow should be executed.

Online

In terms of the online components 22, when a service request 24 from a customer 14 arrives, a service selector and executor module 26 carries out the selection process by considering dynamic run-time context (mostly associated with the customer). A context server 28 within the online module 22 collects run-time context data from both CPs 16 and customers 14. The executor module 26 thus obtains the context from the context server 28, matches it with that in the set of context-dependent alternative workflows 40 to select the appropriate workflow/individual web service, and proceeds to execute it.

Metarules

Each metarule consists of a condition and an action. A condition is formed by the context of the end user and consists of a conjunction of several parameters representing the context of the user. An action specifies directives to determine appropriate set of workflows for selection of a service. An action also enumerates run-time context checks that are to be executed before executing a particular service. Each action may consist of several directives. Each directive specifies evaluation criteria from various service evaluation components. This is used by the workflow engine 38 to select and rank possible alternative workflows to deliver a particular service.

For example, a metarule in high-level construct may look like:

```
<condition>
    premium and peak
</condition>
<actions>
    <Partner-Evaluation>
        Select services wich PRM-Rank < 2
    </Partner-Evaluation>
    <Log-Filter>
        Select services that were
        used with networkstatus=peak
    </Log-Filter>
</actions>
```

A metarule may incorporate any service-level agreement between the service provider and the content providers. Rules specify several constraint checks that enable better selection of the appropriate workflow. The service provider may write metarules that are geared towards optimizing quality-of-service parameters (like service execution time) while maintaining service-level agreements and ensuring partner satisfaction.

An XML representation of a metarule is as follows:

```
<Policy Name="PremiumAndPeakAndRemoteUsers">
    <Condition>
            <UserCategory>premium</UserCategory>
            <Location>remote</Location>
            <NetworkStatus>peak</NetworkStatus>
    </Condition>
    <Actions>
        <HistoryFilters>
            <UserCategory />
            <Location />
            <NetworkStatus>peak</NetworkStatus>
            <Response>fast</Response>
        </HistoryFilters>
        <PRMFilters>
            <PRM-Ranking>
                    <Operator>less</Operator>
                    <Value>4</Value>
            </PRM-Ranking>
        </PRMFilters>
        <PriceFilters>
                <Operator>leq</Operator>
                <Value>0.75</Value>
                <ValueCurrency></ValueCurrency>
        </PriceFilters>
        <ContextChecks>
                <Response>Fast</Response>
        </ContextChecks>
    </Actions>
</Policy>
```

The English representation of the metarule is: For Premium customers and Peak-time calling from a Remote location, use services that have been used in the past at Peak-time and have yielded Fast Response. Moreover, the PPM Rank of those services should be less than 4 and Price-per-Invocation less than $0.75. At run-time, ensure that only those services having a Fast Response at the present moment are selected for execution.

Evaluator Module

CP services are evaluated by the evaluator module 34. Services are evaluated with respect to the existing business contracts existing between the partner and the service provider. Services are also evaluated with respect to absolute performance parameters such as average execution time that may not be part of a business contract. The later class of evaluations are used to filter services based on parameters provided by the customer. The metarule directives specify various filtering criteria to be applied towards a certain service.

Evaluation is carried out based on long-term history, as well as short-term history as well as current execution performance. Service evaluators provide ranks and also determine performance trends that may be used to select services. The Partner relationship evaluation methodology (referred to as PRM, within the evaluator module 34) assigns rankings and ratings to individual business partners or CPs 16 based on long-term conformances to contractual agreements and some other performance factors. An ontology based approach is used, and customised to suit a particular provider's requirements. The ontology (typically a tree) captures the various evaluation factors (vertices) and their interrelationships (edges) and shows how to calculate the evaluation score. The evaluation score calculation is primarily based on assigning weights to the various factors and each vertex just adds up the numbers from its children. The weighted sum of these number results in the evaluation score. The assignment of weights to vertices can be done by the AHP algorithm, as taught in Maggie C. Y. Tam, V. M. Rao Tummala, "An application of the AHP in vendor selection of a telecommunications system", *Omega* 29 (2001), pp. 171-182, incorporated herein by reference.

Figure 3:
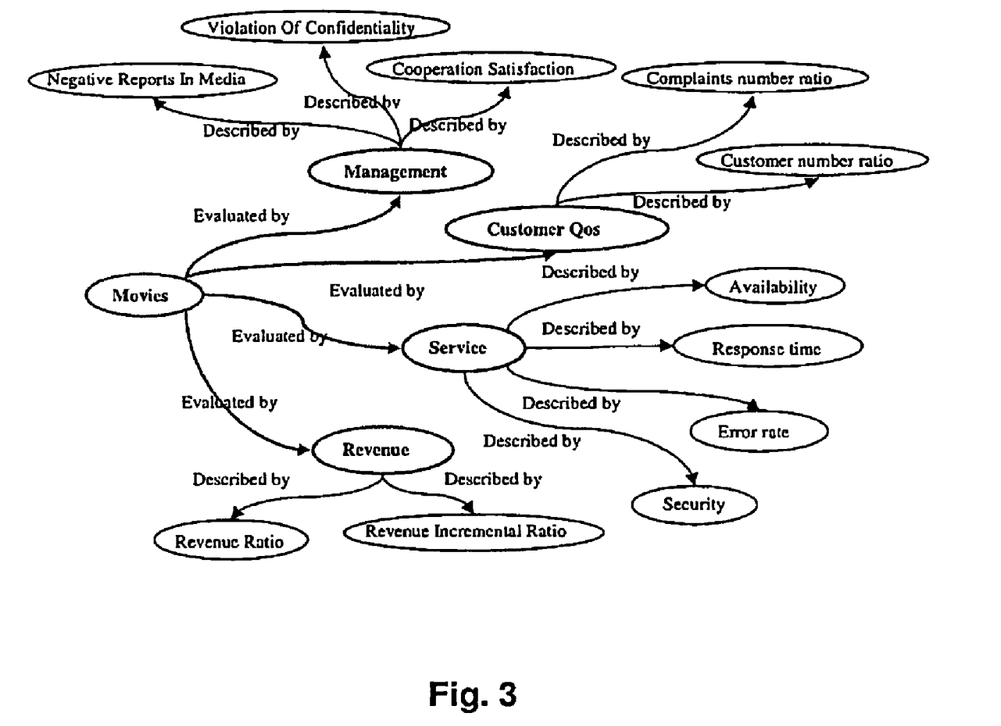
FIG. 3 shows an ontology diagram for CP relationship evaluation performed by the evaluator module.

FIG. 3 shows an example ontology for the subject embodiment, where "movies" are evaluated by the criteria of "revenue", "service", "customer quality of service" and "management". In turn, each criterion is described by various metrics.

The frequency of partner's evaluation update can be either in hours, days or months.

Thus the offline evaluation of business process must be synchronized with this frequency. Let the offline evaluation frequency be $f_O$ and the PRM partner evaluation frequency be $f_P$, then $f_P = Nf_O$, where N is a positive integer and N>1.

This equation signifies that the offline evaluation can be as frequent as the PRM evaluation but not less frequent than that of PRM. If the offline evaluation is less frequent than PRM it means that the system is not using the current partner ratings and rankings but the obsolete one. Currently, the offline evaluation frequency is equal to that of the PRM evaluation. Whenever PRM completes the evaluation of any of the business process the offline evaluation is triggered manually.

Log Context Miner

The log context miner 32 uses Generalized Disjunctive Association Rules (GDAR) (see A. Nanavati, K. P. Chitrapura, S. Joshi and R. Krishnapuram, "Mining generalised disjunctive association rules", in 10th *International Conference on Information and Knowledge Management* (*CIKM*), Atlanta, Ga., pages 482-489, 2001, incorporated herein by reference) and stores the performance (instance level performance) results of the various content providers' actual transactions. Unlike the PRM process, the GDAR process only records technical performance factors like response time, availability, latency etc. Given a context (e.g. find services that were used by premium class users and had a fast response), the GDAR process produces a set of disjunctive association rules that satisfy the context and has a certain degree of confidence. Confidence is a measure of how frequently the rule has been observed in the logs.

Figure 4:
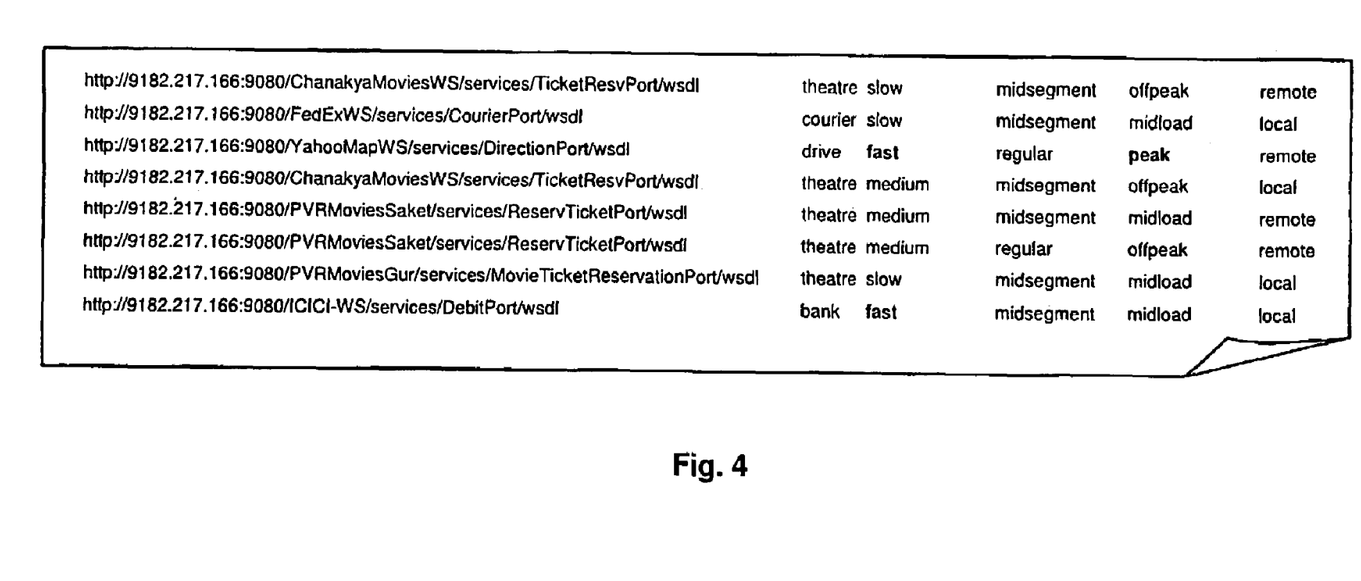
FIG. 4 shows a log record from which CP performance can be determined.
Figure 5:
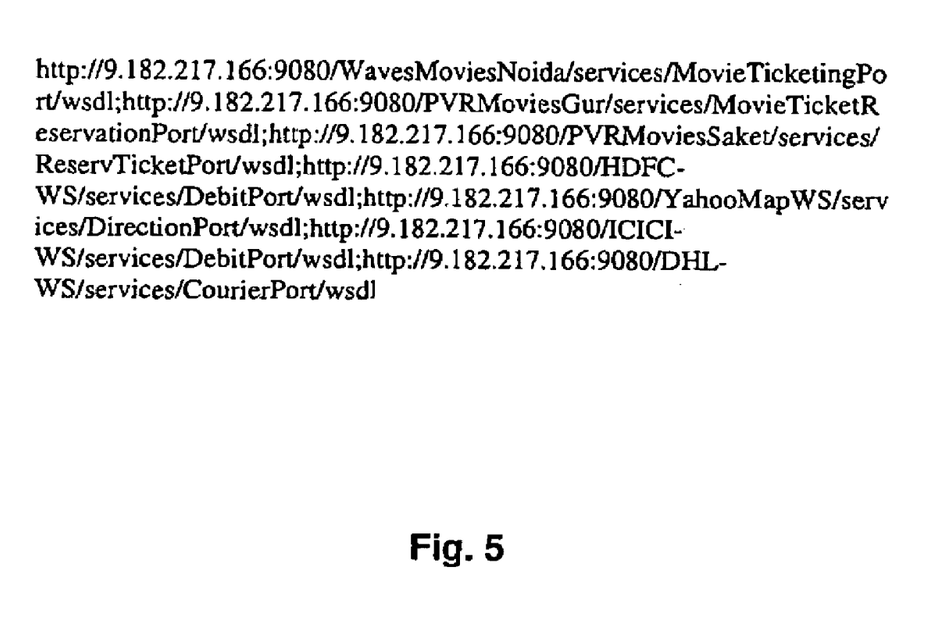
FIG. 5 shows a filtered result from the log record of FIG. 4.

FIG. 4 shows an example log record, containing a URI for a set of CPs 16 and other measured properties, being 'type', 'speed of response to queries', 'market segment', time of service' and 'location'. FIG. 5 shows resultant data following application of GDAR rules. Thus the output from a GDAR process performed by the context miner 32 will be:

premium and fast=>PVR (Gurgaon) & PVR (Saket) & Citibank (New Delhi). Conf=0.9

This implies that PVR (Gurgaon) and PVR (Saket) and Citibank (New Delhi) have individually been invoked by the service provider for premium class users and have yielded fast response, with a confidence of 0.9. Such rules are used to filter out services as prescribed in the metarules. The measurement factors are based on categorical variables (e.g. 'userType' is a categorical variable having 3 values: premium, mid-segment and regular). However, non-categorical variables can be transformed to categorical variables with a defined mapping function.

The PRM and GDAR processes act as a feedback control loop. Each time the respective evaluator module 34 and context miner module 32 update, current information about a business partner's performance and this is reflected in the new rankings of the alternative workflows in the task database 36.

Workflow Engine

For each metarule and for each service supported by the SP 12, the workflow engine 38 performs the task of evaluating each workflow instance of a service and selecting a subset of workflows that pass the evaluation criteria provided in the metarules. The engine 38 also contains a metarule parser that parses the rule instances and determines the appropriate evaluation criteria to be applied on service evaluation data from the context miner module 32 and the evaluator module 34. For example, a rule might formulate that all premium users will use services that have a PRM rank less than 2. These filtering criteria are used consecutively on the set of available workflows to select the set of alternative workflows.

Alternative workflows are then ranked by the engine 38 and these ranked workflows are stored in the context-dependent alternative workflow store 40. Workflows may be ranked based on several criteria (e.g. least costly, fastest response, etc).

Online Service Selection & Executor Module

The online components 22 select one of the pre-ranked workflows to deliver a particular service (or task) upon customer request. Customers can request for a service using multi modal front ends such as web, voice, SMS etc. A customer query usually specifies the task requested, followed by some required input parameters. Context information (i.e. user location, network status etc) is captured by the Online components 22 through user registration information available to it. The context information is used along with the service ID to retrieve a set of alternative workflows from the alternate workflow task store 36.

The context server 28 that provides run-time performance indices of several content provider services in the system. This is necessary since metarules often have run-time context check requirements (e.g. the current response time of the service should be fast). These run-time checks are executed by the executor module 26 for each of the services belonging to the ranked workflows. The first workflow that passes through the test is executed to deliver the particular service.

The executor module 26 contains a Java/SOAP client to invoke these processes using the standard SOAP/HTTP APIs. When a workflow is selected to be executed, the corresponding process signature (parameters to be passed to this process so as to invoke it) is retrieved from the request sent by the user and the process is invoked by the SOAP client with the requisite arguments.

If a selected service fails, the executor module 26 selects an alternative workflow. Pre-ranking of the workflows ensures that such reliability of service delivery is provided with the least possible digression from the desired optimal service execution performance bounds.

Worked Example

An embodiment implements a movie ticket reservation service for cellular users. It is assumed that in order to execute the service, a movie ticket provider site has to be integrated with an online bank account. Four different movie ticket providers and two online banking services are assumed. As such, there are eight instances of workflow instances (consider all combinations) that can be selected.

Assume also that the user is agnostic towards any particular theatre location (within a particular geographic domain). There are three customers registered.

Associate user category (premium, midsegment, regular), location (remote, local) and networkstatus (peak time, off-peak time) as the context of each user. The metarules, stored in the policies module 30, that specify the context-based selection criteria are as follows:

Metarule 1. premium & peak & remote=>History(peak & fast) & PRM (Rank<4) & Price (<,0.75) & run-time-context (responsive=fast)

Metarule 2. premium & offpeak => History (offpeak & fast) & PRM (Rank<3) & run-time-context (responsiveness=medium,fast)

The workflow instances as well as service charge related information (charge per invocation) of the component services are shown in following table:

TABLE 1

| Movie ticket providers | PVR (Saket), PVR (Gurgaon), Chanakya theatres, Waves (Noida) |
|---|---|
| Online banking services | HDFC (SDA branch), ICICI (CP branch) |
| PVR Movies(Saket) | $0.55 |
| PVR Movies(Gurgaon) | $0.60 |
| Chanakya Theaters | $0.25 |
| Waves (Noida) | $0.50 |
| HDFC (SDA branch) | $0.40 |
| ICICI (CP branch) | $0.55 |

In this example, "T1, T2, . . . , T4" represent the movie ticket providers. "B1"0 and "B2" represent the online banking services. "C" represents a courier service. "D" represents driving directions for a courier company. The task database stores the set of alternate workflows ("W"), including:

| W1. | T1 → | B1 → | D1 | | (direct debit for end user) |
|---|---|---|---|---|---|
| W2. | T2 → | B1 → | D2 | | |
| W3. | T1 → | C → | B1 → | D1 | (courier after receiving payment) |
| W4. | T1 → | B1 | | | (ticket booking only) |
| W5. | T1 → | B2 | | | |
| W6. | T1 → | D1 | | | (pay cash at counter) |
| ... | | | | | |
| W20. | | | | | |

There can of course be many more workflows, and those shown are representative only.

The workflow engine 38 selects and ranks the alternative workflows with respect to total service charge per invocation. The evaluator module 34 provides long-term ranking data, such as:

TABLE 2

| CP | Rank | Value |
|---|---|---|
| T1 | 1 | 8.0 |
| T2 | 2 | 7.5 |
| B1 | 1 | 7.0 |
| ... | ... | ... |

For metarule 2 (i.e. services that are fast and have been used at peak hours), the context miner 32 provides the following result:

Peak & fast-response=>T11; T12; D12

Assuming a representative execution log record as shown in FIG. 4 and the representative GDAR process data shown in FIG. 5, then the workflow engine 38 determines which of the alternate workflows satisfies the context of metarule 2 taking into account the evaluator 34 data and the miner 32 data, yielding the following result:

Waves (Noida); PVR Movies(Gurgaon); PVR Movies (Saket); HDFC (SDA branch); ICICI (CP branch); Yahoo Map Service; DHL Courier Service)

This process is performed for all metarules to generate and store ranked workflows. Thus, in this example, the alternate flows store 40 contains three ranked workflows (W2; W1; W3) for the context of metarule 1, and two ranked workflows (W3; W8) for the context of metarule 2.

When a customer 14 requests a service, the executor module 26 derives the context from the context server 28, then selects the first ranked workflow from the store 40 according to the relevant metarule, and executes that service.

Implementation Embodiment

Embodiments of the SP system exist as software (either as source code on a storage medium or executable code in memory) that can be run on the IBM WebSphere Business Integration Server Foundation (WBISF) application server platform. IBM WBISF provides support for deploying BPEL processes and web service-based component applications. The BPEL workflows, deployed on the Business Process Execution (BPE) container in the WBISF, are generated by the WSADIE with SOAP/HTTP bindings. The BPE container is a specialized J2EE application that executes business processes and flows.

Advantages

Embodiments of the system provide a framework that is extensible and allows the performance of CP services to be monitored at a variety of time scales, both to ensure conformance to contractual QoS metrics and to additionally rank or rate them based on other non-contractual performance metrics. This allows a SP to not only meet quantifiable performance guarantees, but also maximize implicit customer satisfaction.

Second, the static selection of alternative workflows for a specific task is also driven by SP metarules, which often capture the business-level preferences of the SP and map them into the actual deployed IT service infrastructure. As a result of this, the service/workflow selection can be easily modified by changing the SP metarules.

Furthermore, the actual service selection logic includes both a static (off-line) optimization component, and a dynamic self-managed context-sensitive selection mechanism. The static or off-line portion of the middleware uses (in addition to metarules) sets of performance logs and analysers to capture performance histories of CPs and a set of alternative candidate workflows per task (service) as input. The output from this component is a subset of "feasible" workflows per task, along with a set of rules enumerating the predicates (some of which refer to attributes that change dynamically) under which a particular workflow should be executed. The runtime component of the system then uses an external context aggregator to retrieve these contextual attributes, and then selects the appropriate workflow from the feasible set based on the attribute values. This allows the SP to easily handle contingencies, such as service unavailability and unexpected traffic.

The invention claimed is:

1. A method for selecting a requested Web service from one of a plurality of providers, comprising:
    defining a set of metarules, wherein each of said metarules comprises at least one condition and at least one action to be used in response to an instance of said at least one condition, said at least one condition comprising at least one parameter representing a context of a user and said at least one action comprising at least one directive for selecting services;
    storing a set of alternative workflows for requested services, wherein each of said alternative workflows comprises multiple web services executed to accomplish a task and wherein each of said alternative workflows is associated with a different provider;
    retaining performance information from previous web service invocations of said providers;
    for each of said metarules, ranking said alternative workflows in said set of alternative workflows, based on said performance information, in order to output a set of context-dependent alternative workflows, including summaries of conditions under which each of said alternative workflows in said set of context-dependent alternative workflows should be executed;
    receiving a customer service request from a customer;
    matching context information from said customer with a summary of conditions for a first ranked one of said context-dependent alternative workflows; and
    automatically selecting said first ranked one of said context-dependent alternative workflows for execution in response to said customer service request.

2. The method according to claim 1, wherein said performance information comprises a component based on technical service properties, and a component based on derived business properties.

3. The method according to claim 2, wherein said technical service properties include one or more of response time, availability, or latency.

4. The method according to claim 2, wherein said business properties include one or both of rankings and ratings of said providers.

5. The method according to claim 1, wherein said performance information comprises a long-term component that considers multiple instances of previous web service invocations, and an instance level component that considers individual service invocations.

6. The method according to claim 1, wherein said ranking comprises filtering said performance information according to a first metarule, parsing said set of feasible workflows according to said first metarule, and ranking parsed workflows according to filtered performance information.

7. The method according to claim 1, further comprising automatically selecting a next ranked one of said context-dependent alternative workflows for execution, if an immediately preceding ranked workflow fails to execute.

8. A method for selecting a requested Web service from one of a plurality of providers, comprising:
    defining a set of metarules, wherein each of said metarules comprises at least one condition and at least one action to be used in response to an instance of said at least one condition, said at least one condition comprising at least one parameter representing a context of a user and said at least one action comprising at least one directive for selecting services;
    storing a set of alternative workflows for requested services, wherein each of said alternative workflows comprises multiple web services executed to accomplish a task and wherein each of said alternative workflows is associated with a different provider;
    retaining performance information from previous web service invocations;
    for each of said metarules, ranking said alternative workflows in said set of alternative workflows, based on said performance information, in order to output a set of context-dependent alternative workflows, including summaries of conditions under which each of said alternative workflows in said set of context-dependent alternative workflows should be executed;
    receiving a customer service request from a customer;
    collecting run-time context data from said providers and said customer;
    matching said run-time context data with a summary of conditions for a first ranked one of said context-dependent alternative workflows; and
    automatically selecting said first ranked one of said context-dependent for execution in response to said customer service request.

9. The method according to claim 8, wherein said performance information comprises a component based on technical service properties, and a component based on derived business properties.

10. The method according to claim 9, wherein said technical service properties include one or more of response time, availability, or latency.

11. The method according to claim 9, wherein said business properties include one or both of rankings and ratings of said providers.

12. The method according to claim 8, wherein said performance information comprises a long-term component that considers multiple instances of previous web service invocations, and an instance level component that considers individual service invocations.

13. The method according to claim 9, wherein said ranking comprises filtering said performance information according to a first metarule, parsing said set of feasible workflows according to said first metarule, and ranking parsed workflows according to filtered performance information.

14. A web services selection server receiving service requests from customers and selecting a workflow from one of a plurality of providers, said web services selection server comprising:
    a task database storing a set of alternative workflows for requested services, wherein each of said alternative workflows comprises multiple web services executed to accomplish a task and wherein each of said alternative workflows is associated with a different provider;
    an evaluator module storing performance information from previous web service invocations by said providers;
    a policies module storing metarules, wherein each of said metarules comprises at least one condition and at least one action to be used in response to an instance of said at least one condition, said at least one condition comprising at least one parameter representing a context of a user and said at least one action comprising at least one directive for selecting services;

a workflow engine ranking, for each of said metarules and based on said performance information, said alternative workflows in said set of alternative workflows in order to output a set of context-dependent alternative workflows, including summaries of conditions under which each of said alternative workflows in said set of context-dependent alternative workflows should be executed; and an executor module receiving a customer service request from a customer, matching context information from said customer with a summary of conditions for a first ranked one of said context-dependent alternative workflows, and automatically selecting said first ranked one of said context-dependent alternative workflows for execution in response to said customer service request.

15. The web services selection server according to claim 14, said executor module further automatically selects a next ranked one of said context-dependent alternative workflows for execution, if an immediately preceding ranked workflow fails to execute.

16. A web services selection server receiving service requests from customers and selecting a workflow from one of a plurality of providers, said web services selection server comprising:

an offline module comprising:

a task database storing a set of alternative workflows for requested services, wherein each of said alternative workflows comprises multiple web services executed to accomplish a task and wherein each of said alternative workflows is associated with a different provider;

an evaluator module storing performance information from previous web service invocations by said providers;

a policies module storing metarules, wherein each of said metarules comprises at least one condition and at least one action to be used in response to an instance of said at least one condition, said at least one condition comprising at least one parameter representing a context of a user and said at least one action comprising at least one directive for selecting services;

a workflow engine ranking, for each of said metarules and based on said performance information, said alternative workflows in said set of alternative workflows in order to output a set of context-dependent alternative workflows, including summaries of conditions under which each of said alternative workflows in said set of context-dependent alternative workflows should be executed; and a runtime module comprising:

a context server collecting run-time context data from said providers and said customers; and an executor module receiving a customer service request from a customer, matching said run-time context data with a summary of conditions for a first ranked one of said context-dependent alternative workflows, and automatically selecting said first ranked one of said context-dependent alternative workflows for execution in response to said customer service request.

* * * * *